United States Patent
Miyake et al.

(10) Patent No.: US 12,157,524 B2
(45) Date of Patent: Dec. 3, 2024

(54) STEERING DEVICE

(71) Applicants: JTEKT CORPORATION, Kariya (JP); TOYOTA JIDOSHA KABUSHIKI KAISHA, Toyota (JP)

(72) Inventors: Junya Miyake, Okazaki (JP); Takashi Kodera, Okazaki (JP); Toru Takashima, Susono (JP); Hidetsugu Toyama, Susono (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/469,511

(22) Filed: Sep. 8, 2021

(65) Prior Publication Data
US 2022/0081023 A1 Mar. 17, 2022

(30) Foreign Application Priority Data
Sep. 17, 2020 (JP) ................. 2020-156289

(51) Int. Cl.
*B62D 5/04* (2006.01)
*B62D 5/00* (2006.01)

(52) U.S. Cl.
CPC ........... *B62D 5/0463* (2013.01); *B62D 5/006* (2013.01); *B62D 5/0421* (2013.01)

(58) Field of Classification Search
CPC .... B62D 5/0463; B62D 5/006; B62D 5/0421; B62D 6/02; B62D 6/002; B62D 5/0469; B62D 5/046; B62D 6/008
See application file for complete search history.

(56) References Cited

U.S. PATENT DOCUMENTS

| | | | | |
|---|---|---|---|---|
| 6,152,255 A | * | 11/2000 | Noro | B62D 6/007 |
| | | | | 180/443 |
| 11,465,674 B2 | * | 10/2022 | Kodera | B62D 5/0463 |
| 2006/0047391 A1 | | 3/2006 | Katou | |

(Continued)

FOREIGN PATENT DOCUMENTS

| | | | | |
|---|---|---|---|---|
| DE | 10121873 A1 | * | 11/2002 | ........... B62D 5/0469 |
| DE | 102010003658 A1 | | 10/2011 | |

(Continued)

OTHER PUBLICATIONS

Feb. 14, 2022 Search Report issued in European Patent Application No. 21196618.9.

(Continued)

*Primary Examiner* — Kurt Philip Liethen
(74) *Attorney, Agent, or Firm* — Oliff PLC

(57) ABSTRACT

A steering device includes a turning shaft, a turning motor, and a control device that controls the turning motor such that an angle capable of being converted into a turning angle of a turning wheel follows a target angle that is calculated depending on a steering state of a steering wheel. The control device executes a correction process of correcting the target angle. The control device corrects the target angle such that the degree of an increase in the target angle is slower as the target angle approaches a limit value of an angle region, when the target angle increases toward the limit value of the angle region in either of a vehicle stop state or an extremely low speed state.

8 Claims, 3 Drawing Sheets

(56) References Cited

U.S. PATENT DOCUMENTS

| | | | |
|---|---|---|---|
| 2010/0070137 A1* | 3/2010 | Yamaguchi | B62D 5/008 |
| | | | 701/41 |
| 2017/0029013 A1 | 2/2017 | Oya | |
| 2018/0154932 A1* | 6/2018 | Rakouth | B62D 1/286 |
| 2019/0039647 A1* | 2/2019 | Tsubaki | B62D 6/007 |
| 2019/0232975 A1* | 8/2019 | Kodera | B62D 1/18 |
| 2019/0233001 A1* | 8/2019 | Namikawa | B62D 5/001 |
| 2019/0367083 A1* | 12/2019 | Kodera | B62D 6/04 |
| 2020/0023892 A1* | 1/2020 | Hong | B62D 5/0469 |
| 2020/0130737 A1* | 4/2020 | Kodera | B62D 6/008 |
| 2021/0016830 A1 | 1/2021 | Riese et al. | |

FOREIGN PATENT DOCUMENTS

| | | |
|---|---|---|
| JP | 2006-062624 A | 3/2006 |
| JP | 2010-264833 A | 11/2010 |
| JP | 2014-133521 A | 7/2014 |
| JP | 2015-123865 A | 7/2015 |
| JP | 2017-024683 A | 2/2017 |
| JP | 2020-083058 A | 6/2020 |
| WO | 2019/174807 A1 | 9/2019 |

OTHER PUBLICATIONS

Nov. 21, 2023 Office Action issued in Japanese Patent Application No. 2020-156289.

* cited by examiner

STEERING DEVICE

CROSS-REFERENCE TO RELATED APPLICATION

This application claims priority to Japanese Patent Application No. 2020-156289 filed on Sep. 17, 2020, incorporated herein by reference in its entirety.

BACKGROUND

1. Technical Field

The disclosure relates to a steering device of a vehicle.

2. Description of Related Art

There is a so-called steer-by-wire steering device in which dynamic power transmission is separated between a steering wheel and turning wheels. For example, a steering device described in Japanese Unexamined Patent Application Publication No. 2014-133521 (JP 2014-133521 A) includes a reaction force motor that is a generation source of a steering reaction force to be given to a steering shaft and a turning motor that is a generation source of a turning force for turning the turning wheels. At the time of traveling of a vehicle, a control device for the steering device generates the steering reaction force through an electricity supply control of the reaction force motor, and turns the turning wheels through an electricity supply control of the turning motor.

SUMMARY

Conventionally, in general steer-by-wire steering devices including the steering device in JP 2014-133521 A, when the steering wheel is operated by a driver, the turning wheels are turned while a force balance between the turning force that is generated by the turning motor and an axial force that is generated in a turning shaft is kept.

However, in the case of generation of an axial force exceeding the maximal turning force that can be generated by the turning motor, it is difficult to keep the force balance between the turning force that is generated by the turning motor and the axial force that acts on the turning shaft, depending on axial force characteristic of the vehicle. Therefore, there is fear that it is difficult to smoothly turn the turning wheels depending on a steering state of the steering wheel.

For example, in the case of a so-called stationary steering by which the turning wheels are turned in a vehicle stop state, a higher axial force is easily generated. However, the following phenomenon can occur depending on the axial force characteristic of the vehicle. That is, the turning wheels do not move at the time when the stationary steering is performed, and the turning wheels start to move after the axial force is decreased by start of the vehicle. There is concern that the driver has a strangeness feeling about the occurrence of the phenomenon.

The disclosure makes it possible to more smoothly turn the turning wheels.

An aspect of the disclosure is a steering device. The steering device includes: a turning shaft configured to turn a turning wheel of a vehicle, with dynamic power transmission being separated between the turning shaft and a steering wheel; a turning motor configured to generate a turning force, the turning force being a torque that is given to the turning shaft for turning the turning wheel; and a control device configured to control the turning motor such that an angle capable of being converted into a turning angle of the turning wheel follows a target angle that is calculated depending on a steering state of the steering wheel. The control device is configured to execute a correction process of correcting the target angle such that the target angle is an angle within an angle region in which a force balance is capable of being kept, the force balance being a balance between a maximal turning force that is capable of being generated by the turning motor and an axial force that is generated in the turning shaft. The control device is configured to correct the target angle such that the degree of an increase in the target angle is slower as the target angle approaches a limit value of the angle region, when the target angle increases toward the limit value of the angle region in either of a vehicle stop state or an extremely low speed state.

With the above configuration, the target angle is corrected such that the target angle is the angle within the angle region in which it is possible to keep the force balance between the maximal turning force that can be generated by the turning motor and the axial force that is generated in the turning shaft. Therefore, the target angle is avoided from falling outside the angle region in which it is possible to keep the force balance between the turning force of the turning motor and the axial force that is generated in the turning shaft. That is, it is possible to avoid the situation of the generation of the axial force exceeding the maximal turning force that can be generated by the turning motor. Accordingly, it is possible to more smoothly turn the turning wheel depending on the steering state of the steering wheel.

There is fear that the driver has a strangeness feeling about a vehicle behavior associated with the execution of the correction process for the target angle. The strangeness feeling can be strong, particularly, in the vehicle stop state or the extremely low speed state, in which a situation of a larger turning easily occurs.

In this regard, with the above steering device, when the target angle increases toward the limit value of the angle region at which it becomes difficult to keep the force balance between the turning force of the turning motor and the axial force, in the vehicle stop state or the extremely low speed state, the target angle is corrected such that the degree of the increase in the target angle is slower as the target angle approaches the limit value. Since the target angle more slowly changes toward the limit value, it is possible to reduce the strangeness feeling of the driver about the vehicle behavior.

In the steering device, the control device may be configured to set a restriction value that restricts a change range of the target angle. The control device may be configured to set the restriction value such that the rate of an increase in the restriction value to the increase in the target angle gradually decreases with the increase in the target angle in either of the vehicle stop state or the extremely low speed state.

With the above configuration, it is possible to correct the target angle by restricting the target angle with the restriction value. In the steering device, the control device may be configured to set a subtraction value to be subtracted from the target angle that is calculated depending on the steering state of the steering wheel, such that the degree of the increase in the target angle is slower as the target angle approaches the limit value of the angle region, when the target angle increases toward the limit value of the angle region in either of the vehicle stop state or the extremely low speed state.

With the above configuration, it is possible to correct the target value by subtracting the subtraction value from the target angle. In the steering device, when the restriction value is a first restriction value, the control device may be configured to restrict the change range of the target angle using a second restriction value instead of the first restriction value, when the vehicle is not in either of the vehicle stop state or the extremely low speed state, the second restriction value being a fixed value that is set based on the limit value of the angle region, and may be configured to gradually change the first restriction value or the second restriction value with respect to time, by performing a gradual change process for the first restriction value or the second restriction value.

With the above configuration, when the restriction value for restricting the target angle is switched between the first restriction value and the second restriction value, the restriction value for restricting the target angle is avoided from rapidly changing. Therefore, it is possible to avoid the target angle from rapidly changing.

In the steering device, in a case where the vehicle has an automatic driving control function, the control device may be configured not to execute the correction process regardless of the value of a vehicle speed, when the automatic driving control function is in an on-state.

When the automatic driving control is executed in the case where the correction process for the target angle is executed, there is fear that an appropriate execution of the automatic driving control is impeded. In this regard, with the above configuration, when the automatic driving control function is in the on-state, the correction process for the target angle is not executed regardless of the value of the vehicle speed. Therefore, the correction process for the target angle hinders the execution of the automatic driving control. In the case where it is required not to hinder the execution of the automatic driving control due to a product specification or the like, it is possible to meet this requirement.

In the steering device, the control device may be configured not to execute the correction process regardless of the value of the vehicle speed, when a vehicle speed state is not normal, or when a shift position is in a reverse range in a case where the vehicle has a back guide monitor function by which a backward movement operation of the vehicle is assisted.

In the case where the vehicle speed state is not normal, when the correction process for the target angle is executed based on the abnormal vehicle speed, there is fear that the correction process rather gives the strangeness feeling to the driver. In this regard, with the above configuration, in the case where the vehicle speed state is not normal, the correction process for the target angle is not executed regardless of the value of the vehicle speed. Therefore, it is possible to avoid the strangeness feeling from being given to the driver.

Further, the back guide monitor function by which the backward movement operation of the vehicle is assisted is provided in the vehicle, depending on the product specification or the like. In the case where the backward movement operation of the vehicle is performed in the extremely low speed state based on the function, an expected pathway line (expected trajectory line) of the vehicle that is displayed on a display in a vehicle cabin changes depending on the vehicle speed by performing the correction process for the target angle at the time of the backward movement operation, and there is fear that the correction process rather gives the strangeness feeling to the driver. In this regard, with the above steering device, in the case where the shift position is in the reverse range, that is, in the case where the backward movement operation of the vehicle is performed, the correction process for the target angle is not executed regardless of the value of the vehicle speed. Therefore, it is possible to avoid the strangeness feeling from being given to the driver.

With the steering device in the disclosure, it is possible to more smoothly turn the turning wheels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
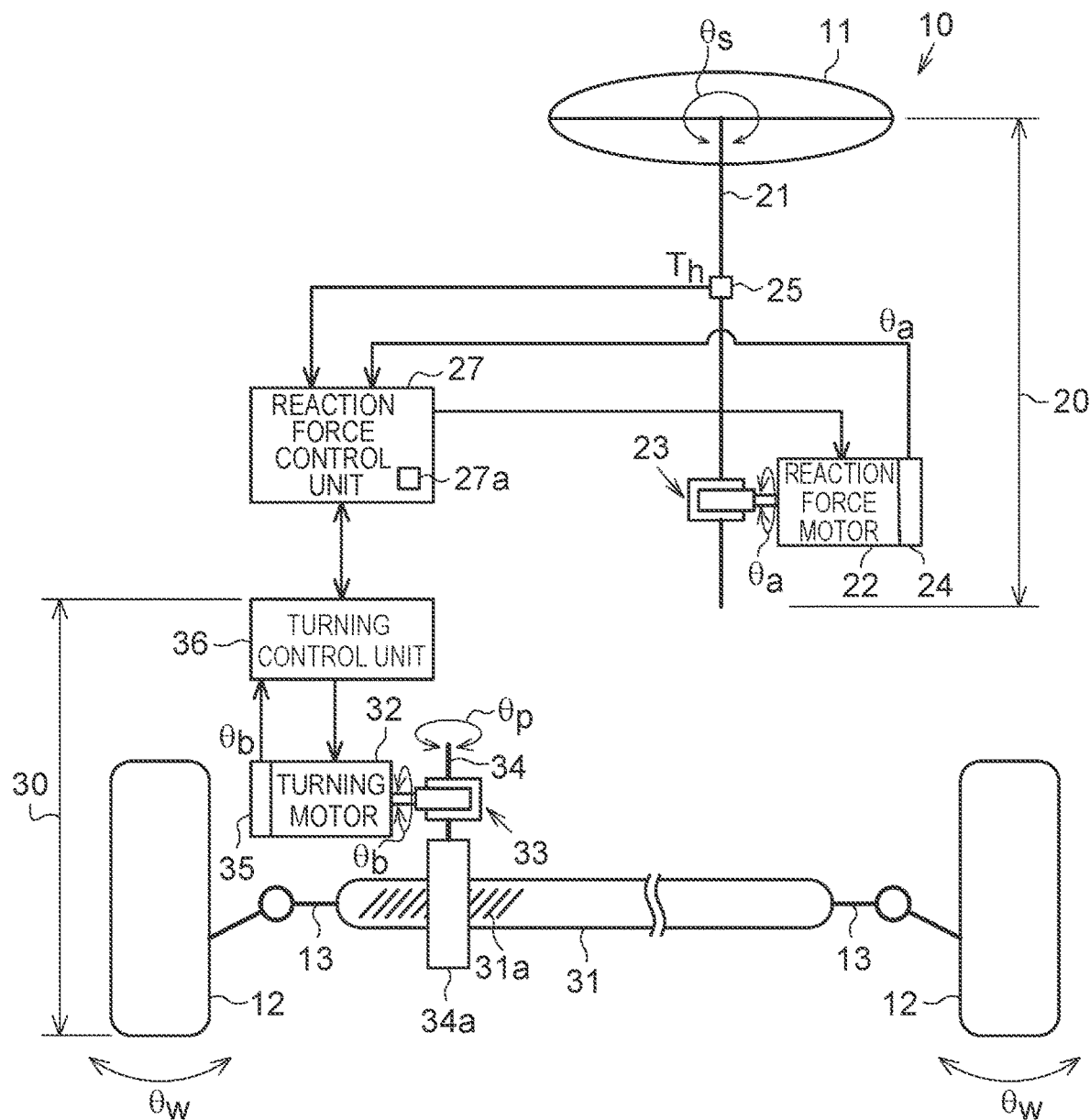
FIG. 1 is a configuration diagram showing an embodiment of a steering device.

An embodiment in which a steering device is embodied will be described below. As show in FIG. 1, a steering device 10 of a vehicle includes a reaction force unit 20 that gives a steering reaction force to a steering wheel 11 of the vehicle and a turning unit 30 that turns turning wheels 12 of the vehicle. The steering reaction force is a torque that acts in the opposite direction of the direction of driver's operation of the steering wheel 11. By giving the steering reaction force to the steering wheel 11, it is possible to give a moderate hand response feeling to the driver.

The reaction force unit 20 includes a steering shaft 21 with which the steering wheel 11 is linked, a reaction force motor 22, a speed reducer 23, a rotation angle sensor 24, a torque sensor 25, and a reaction force control unit 27.

The reaction force motor 22 is a generation source of the steering reaction force. As the reaction force motor 22, for example, a three-phase brushless motor is employed. The reaction force motor 22 is linked with the steering shaft 21 through the speed reducer 23. The torque generated by the reaction force motor 22 is given to the steering shaft 21 as the steering reaction force.

The rotation angle sensor 24 is provided on the reaction force motor 22. The rotation angle sensor 24 detects a rotation angle $\theta_a$ of the reaction force motor 22. The torque sensor 25 is provided at a portion between the speed reducer 23 on the steering shaft 21 and the steering wheel 11. The torque sensor 25 detects a steering torque $T_h$ that is applied to the steering shaft 21 through a rotation operation of the steering wheel 11.

The reaction force control unit 27 calculates a steering angle $\theta_s$ that is the rotation angle of the steering shaft 21, based on the rotation angle $\theta_a$ of the reaction force motor 22 that is detected through the rotation angle sensor 24. The reaction force control unit 27 counts a rotation number on the basis of the rotation angle $\theta_a$ (referred to as a "motor neutral point", hereinafter) of the reaction force motor 22 that corresponds to a steering neutral position of the steering wheel 11. The reaction force control unit 27 calculates the steering angle $\theta_s$ of the steering wheel 11 by calculating an integrated angle that is an angle resulting from integrating the rotation angle $\theta_a$ using the motor neutral point as an origin point and multiplying the calculated integrated angle by a conversion factor based on the reduction ratio of the speed reducer 23. The motor neutral point is stored in the reaction force control unit 27 as steerage angle neutral point information.

The reaction force control unit 27 executes a reaction force control of generating a steering reaction force corresponding to the steering torque $T_h$ through a drive control of the reaction force motor 22. The reaction force control unit 27 calculates a target steering reaction force based on the steering torque $T_h$ detected through the torque sensor 25, and calculates a target steering angle of the steering wheel 11 based on the calculated target steering reaction force and the steering torque $T_h$. The reaction force control unit 27 evaluates the difference between the steering angle $θ_s$ calculated based on the rotation angle $θ_a$ of the reaction force motor 22 and the target steering angle, and controls the supply of electricity to the reaction force motor 22 such that the difference is eliminated. The reaction force control unit 27 performs a vector control of the reaction force motor 22, using the rotation angle $θ_a$ of the reaction force motor 22 that is detected through the rotation angle sensor 24.

The turning unit 30 includes a turning shaft 31, a turning motor 32, a speed reducer 33, a pinion shaft 34, a rotation angle sensor 35, and a turning control unit 36. The turning shaft 31 extends along a vehicle width direction (a right-left direction in FIG. 1). Right and left turning wheels 12 are linked with both ends of the turning shaft 31 through tie rods 13.

The turning motor 32 is a generation source of a turning force. As the turning motor 32, for example, a three-phase brushless motor is employed. The turning motor 32 is linked with the pinion shaft 34 through the speed reducer 33. Pinion teeth 34a of the pinion shaft 34 engage with rack teeth 31a of the turning shaft 31. The torque generated by the turning motor 32 is given to the turning shaft 31 through the pinion shaft 34, as the turning force. The turning shaft 31 moves along the vehicle width direction (the right-left direction in FIG. 1), in response to the rotation of the turning motor 32. By the movement of the turning shaft 31, a turning angle $θ_w$ of the turning wheels 12 is changed.

The rotation angle sensor 35 is provided on the turning motor 32. The rotation angle sensor 35 detects a rotation angle $θ_b$ of the turning motor 32. The turning control unit 36 executes a turning control of turning the turning wheels 12 depending on a steering state through a drive control of the turning motor 32. The turning control unit 36 calculates a pinion angle $θ_p$ that is the rotation angle of the pinion shaft 34 based on the rotation angle $θ_b$ of the turning motor 32 that is detected through the rotation angle sensor 35. Further, the turning control unit 36 calculates a target pinion angle that is a target rotation angle of the pinion shaft 34, using the target steering angle that is calculated by the reaction force control unit 27. The target rotation angle of the pinion shaft 34 is calculated from a standpoint of achievement of a predetermined steerage angle ratio. The turning control unit 36 evaluates the difference between the target pinion angle of the pinion shaft 34 and an actual pinion angle $θ_p$, and controls the supply of electricity to the turning motor 32 such that the difference is eliminated. The turning control unit 36 controls a vector control of the turning motor 32, using the rotation angle $θ_b$ of the turning motor 32 that is detected through the rotation angle sensor 35.

Figure 2:
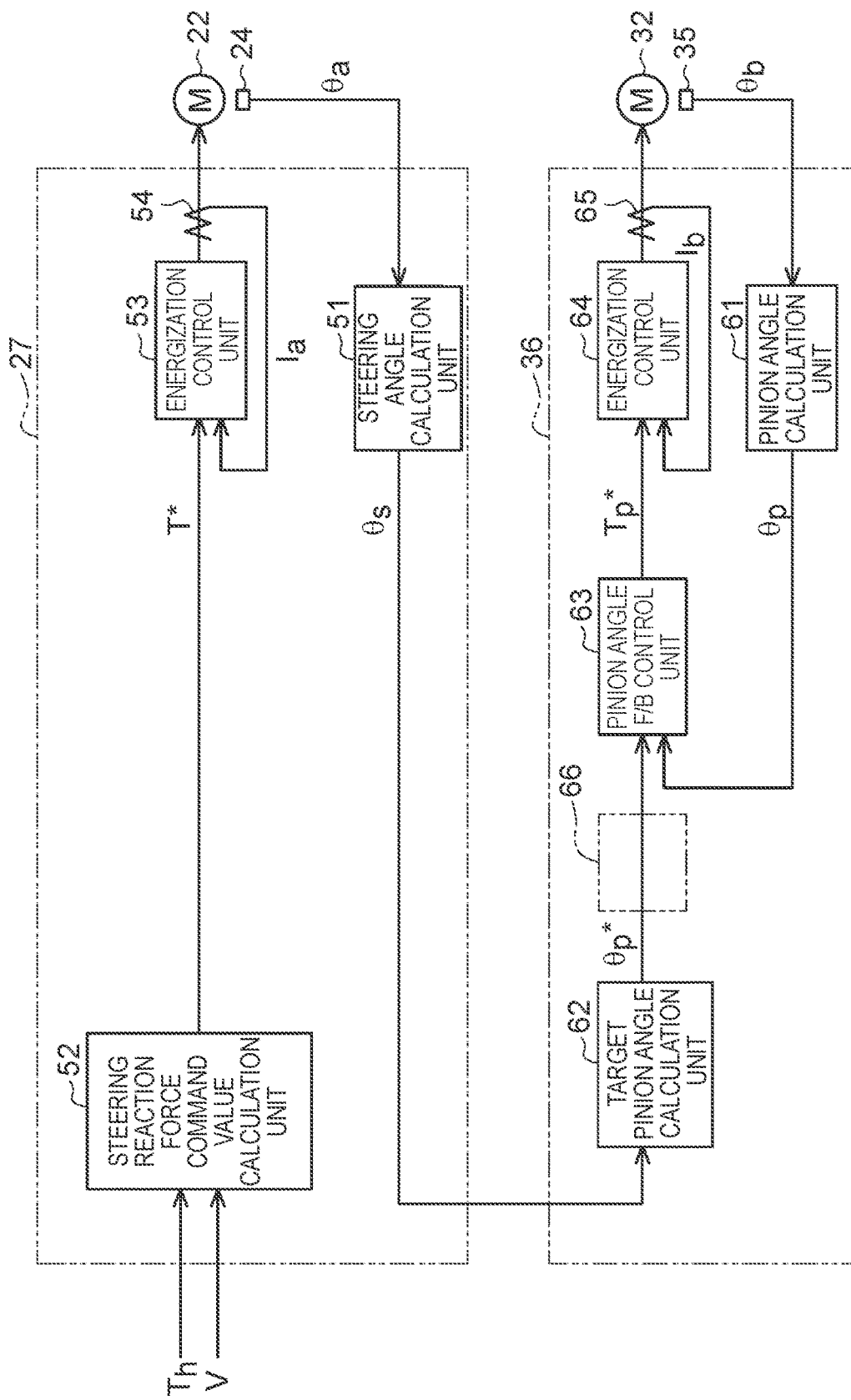
FIG. 2 is a block diagram of a control device in the embodiment.

Next, the reaction force control unit 27 will be described in detail. As shown in FIG. 2, the reaction force control unit 27 includes a steering angle calculation unit 51, a steering reaction force command value calculation unit 52, and an energization control unit 53.

The steering angle calculation unit 51 calculates the steering angle $θ_s$ of the steering wheel 11, based on the rotation angle $θ_a$ of the reaction force motor 22 that is detected through the rotation angle sensor 24. The steering reaction force command value calculation unit 52 calculates a steering reaction force command value T* based on the steering torque $T_h$ and a vehicle speed V. The steering reaction force command value calculation unit 52 calculates the steering reaction force command value T* such that the absolute value of the steering reaction force command value T* is larger as the absolute value of the steering torque $T_h$ is larger and the vehicle speed V is lower. The steering reaction force command value calculation unit 52 will be described later in detail.

The energization control unit 53 supplies an electric power corresponding to the steering reaction force command value T*, to the reaction force motor 22. Specifically, the energization control unit 53 calculates a current command value for the reaction force motor 22, based on steering reaction force command value T*. Further, the energization control unit 53 detects the value of an actual current $I_a$ that is generated on an electricity supply path to the reaction force motor 22, through a current sensor 54 provided on the electricity supply path. The value of the current $I_a$ is the value of the actual current that is supplied to the reaction force motor 22. Then, the energization control unit 53 evaluates the deviation between the current command value and the value of the actual current $I_a$, and controls the supply of electricity to the reaction force motor 22 such that the deviation is eliminated. Thereby, the reaction force motor 22 generates a torque corresponding to the steering reaction force command value T*. It is possible to give a moderate hand response feeling corresponding to a road surface reaction force, to the driver.

Next, the turning control unit 36 will be described in detail. As shown in FIG. 2, the turning control unit 36 includes a pinion angle calculation unit 61, a target pinion angle calculation unit 62, a pinion angle feedback control unit 63, and an energization control unit 64.

The pinion angle calculation unit 61 calculates the pinion angle $θ_p$ that is an actual rotation angle of the pinion shaft 34, based on the rotation angle $θ_b$ of the turning motor 32 that is detected through the rotation angle sensor 35. The turning motor 32 and the pinion shaft 34 coordinates through the speed reducer 33. Therefore, there is a correlation between the rotation angle $θ_b$ of the turning motor 32 and the pinion angle $θ_p$. Using the correlation, it is possible to evaluate the pinion angle $θ_p$ from the rotation angle $θ_b$ of the turning motor 32. Further, the pinion shaft 34 engages with the turning shaft 31. Therefore, there is a correlation between the pinion angle $θ_p$ and the movement amount of the turning shaft 31. That is, the pinion angle $θ_p$ is a value that reflects the turning angle $θ_w$ of the turning wheels 12.

The target pinion angle calculation unit 62 calculates a target pinion angle $θ_p$* based on the steering angle $θ_s$ that is calculated by the steering angle calculation unit 51. In the embodiment, the target pinion angle calculation unit 62 sets the target pinion angle θp* to the same value as the steering angle $θ_s$. That is, the steerage angle ratio that is the ratio between the steering angle $θ_s$ and the turning angle $θ_w$ is "1:1".

The target pinion angle calculation unit 62 may set the target pinion angle $θ_p$* to a different value from the steering angle $θ_s$. That is, the target pinion angle calculation unit 62 sets the steerage angle ratio that is the ratio of the turning angle $θ_w$ to the steering angle $θ_s$, depending on a vehicle traveling state such as the vehicle speed V, for example, and calculates the target pinion angle $\theta_p^*$ depending on the set steerage angle ratio. The target pinion angle calculation unit 62 calculates the target pinion angle $\theta_p^*$, such that the turning angle $\theta$, relative to the steering angle $\theta_s$ is larger as the vehicle speed V is lower and such that the turning angle $\theta_w$ relative to the steering angle $\theta_s$ is smaller as the vehicle speed V is higher. For realizing the steerage angle ratio that is set depending on the vehicle traveling state, the target pinion angle calculation unit 62 calculates a correction angle for the steering angle $\theta_s$, and calculates the target pinion angle $\theta_p^*$ depending on the set steerage angle ratio, by adding the calculated correction angle to the steering angle $\theta_s$.

The pinion angle feedback control unit 63 takes in the target pinion angle $\theta_p^*$ calculated by the target pinion angle calculation unit 62 and the actual pinion angle $\theta_p$ calculated by the pinion angle calculation unit 61. The pinion angle feedback control unit 63 calculates a torque command value $T_p^*$ for the torque that is generated by the turning motor 32, through a feedback control of the pinion angle $\theta_p$ for causing the actual pinion angle $\theta_p$ to follow the target pinion angle $\theta_p^*$.

The energization control unit 64 supplies an electric power corresponding to the torque command value $T_p^*$, to the turning motor 32. Specifically, the energization control unit 64 calculates a current command value for the turning motor 32, based on the torque command value $T_p^*$. Further, the energization control unit 64 detects the value of an actual current $I_b$ that is generated on an electricity supply path to the turning motor 32, through a current sensor 65 provided on the electricity supply path. The value of the current $I_b$ is the value of the actual current that is supplied to the turning motor 32. Then, the energization control unit 64 evaluates the deviation between the current command value and the value of the actual current $I_b$, and controls the supply of electricity to the turning motor 32 such that the deviation is eliminated. Thereby, the turning motor 32 rotates by an angle corresponding to the torque command value $T_p^*$.

In the steer-by-wire steering device 10, in the case where the steering wheel 11 is operated by the driver, the turning wheels 12 are turned while a force balance between the turning force that is generated by the turning motor 32 and an axial force that acts on the turning shaft 31 is kept. However, in the case of generation of an axial force exceeding the maximal turning force that can be generated by the turning motor 32, it is difficult to keep the force balance between the turning force that is generated by the turning motor 32 and the axial force that acts on the turning shaft 31. Therefore, there is fear that it is difficult to smoothly turn the turning wheels 12 depending on the steering state of the steering wheel 11.

Hence, in the embodiment, the following configuration is employed as the turning control unit 36, for more smoothly turning the turning wheels 12 while avoiding the situation of the generation of the axial force exceeding the maximal turning force (referred to as "the maximum output of the turning motor 32", hereinafter) that can be generated by the turning motor 32.

As shown by a two-dot chain line in FIG. 2, the turning control unit 36 includes a correction processing unit 66. The correction processing unit 66 is provided on a calculation path between the target pinion angle calculation unit 62 and the pinion angle feedback control unit 63.

The correction processing unit 66 corrects the target pinion angle $\theta_p^*$ calculated by the target pinion angle calculation unit 62, according to axial force characteristic of the vehicle, such that a final target pinion angle $\theta_p^*$ to be supplied to the pinion angle feedback control unit 63 is an angle within an angle region in which the force balance between the maximum output of the turning motor 32 and the axial force is capable of being kept.

Figure 3:
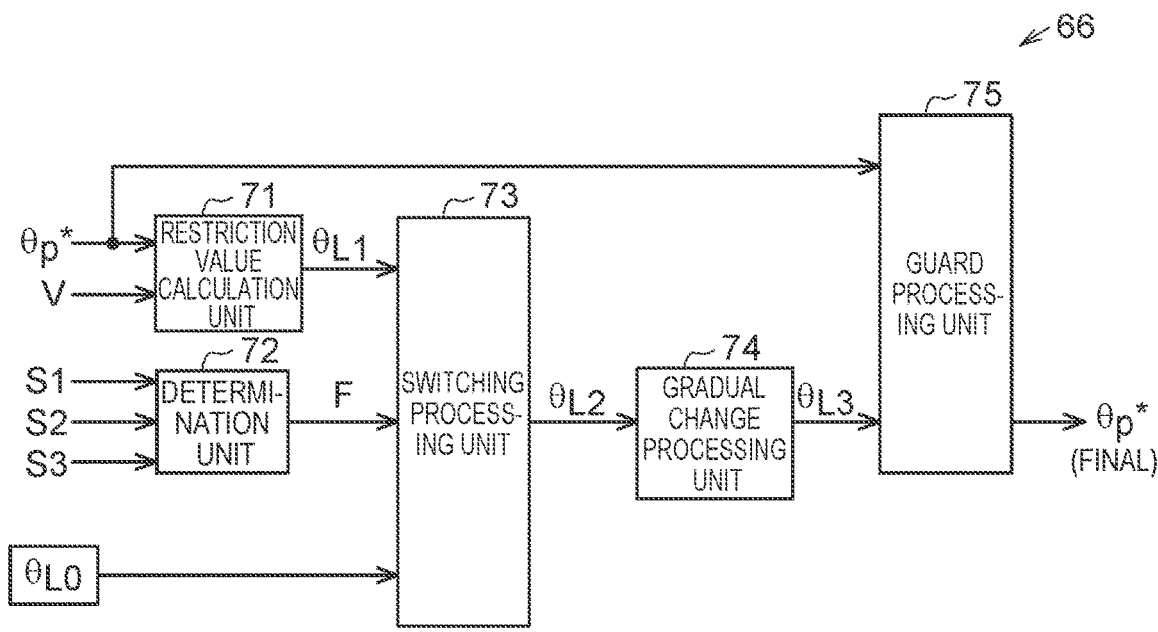
FIG. 3 is a block diagram showing a part of a turning control unit in the embodiment.

As shown in FIG. 3, the correction processing unit 66 includes a restriction value calculation unit 71, a determination unit 72, a switching processing unit 73, a gradual change processing unit 74, and a guard processing unit 75. The restriction value calculation unit 71 takes in the target pinion angle $\theta_p^*$ calculated by the target pinion angle calculation unit 62 and the vehicle speed V detected through the vehicle speed sensor, and calculates a restriction value $\theta_{L1}$ for the target pinion angle $\theta_p^*$ based on the taken target pinion angle $\theta_p^*$ and the vehicle speed V. The change range of the target pinion angle $\theta_p^*$ is restricted by the restriction value $\theta_{L1}$. For example, the restriction value $\theta_{L1}$ is set based on a limit value of an angle that allows the balance between the maximum output of the turning motor 32 and the axial force to be kept depending on the axial force characteristic of the vehicle in the case where the vehicle V is a speed in an extremely low speed region. For example, the speed in the extremely low speed region is a speed equal to or lower than 5 km/h.

The axial force at the time of a stationary steering by which the turning wheels 12 are turned in the vehicle stop state or the axial force when the turning wheels 12 are turned in the case where the vehicle speed V is a speed within the extremely low speed region is much higher than the axial force when the turning wheels 12 are turned in the case where the vehicle speed V is a speed beyond the extremely low speed region. In other words, the axial force when the turning wheels 12 are turned in the case where the vehicle speed V is a speed beyond the extremely low speed region is much lower than the axial force when the turning wheels 12 are turned in the case where the vehicle speed is a speed within the extremely low speed region.

The restriction value calculation unit 71 calculates the restriction value $\theta_{L1}$ using a map that defines a relation between the target pinion angle $\theta_p^*$ and the restriction value $\theta_{L1}$. For example, the map is set from a standpoint of the restriction of the target pinion angle $\theta_p^*$ to the angle within the angle region in which the force balance between the maximum output of the turning motor 32 and the axial force is capable of being kept depending on the axial force characteristic of the vehicle in the case of the vehicle stop state or in the case where the vehicle speed V is a speed in the extremely low speed region.

Figure 4:
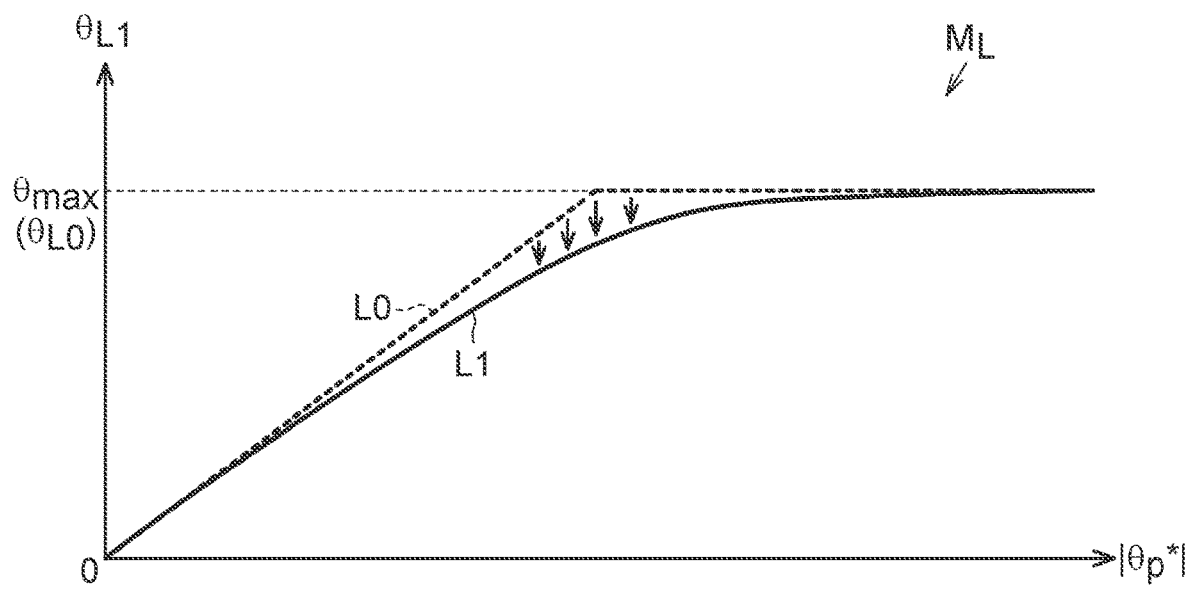
FIG. 4 is a graph showing a relation between a target pinion angle and a restriction value in the embodiment.

As shown in FIG. 4, the characteristic of a map $M_L$ is as follows. That is, as shown by a characteristic line L1, the restriction value $\theta_{L1}$ gradually increases toward a maximum value $\theta_{max}$ of the restriction value $\theta_{L1}$ as the absolute value of the target pinion angle $\theta_p^*$ increases from "0". However, the rate (the slope of the characteristic line L1) of the increase in the restriction value $\theta_{L1}$ to the increase in the absolute value of the target pinion angle $\theta_p^*$ gradually becomes smaller as the absolute value of the target pinion angle $\theta_p^*$ increases. That is, the gradient of the increase in the restriction value $\theta_{L1}$ to the increase in the absolute value of the target pinion angle $\theta_p^*$ becomes gentler as the absolute value of the target pinion angle $\theta_p^*$ increases. The maximum value $\theta_{max}$ is set based on the limit value of the angle that allows the balance between the maximum output of the turning motor 32 and the axial force to be kept depending on the axial force characteristic of the vehicle. Further, the maximum value $\theta_{max}$ is set depending on the vehicle speed V.

As shown by a characteristic line L0, the restriction value $\theta_{L1}$ more slowly increases with the increase in the absolute value of the target pinion angle $\theta_p^*$, compared to a case where the restriction value $\theta_{L1}$ is linearly increased with respect to the increase in the absolute value of the target pinion angle $\theta_p^*$, and then, reaches the maximum value $\theta_{max}$.

The determination unit 72 determines whether the current situation is a situation where the restriction value $\theta_{L1}$ calculated by the restriction value calculation unit 71 should be enabled or a situation where the restriction value $\theta_{L1}$ should be disabled. The determination unit 72 takes in a vehicle speed state signal S1 that is an electric signal indicating a vehicle speed state of whether the vehicle speed V detected through the vehicle speed sensor is normal, as a state variable that reflects the traveling state of the vehicle. For example, when an abnormality or failure of the vehicle speed sensor is detected, it is determined that the vehicle speed V is not normal. Further, the determination unit 72 takes in a shift position state signal S2 that is an electric signal indicating the current shift position of the vehicle. The shift position state signal S2 is used for determining whether a backward movement operation of the vehicle is performed. Further, the determination unit 72 takes in an automatic driving state signal S3 that is an electric signal indicating whether an automatic driving control function is in an on-state or in an off-state. The automatic driving control function includes an automatic driving control function allowing an autonomous driving in which the steering is not performed by the driver, in addition to driving assist control functions such as a parking assist function.

The determination unit 72 sets the value of a flag F based on the vehicle state signal S1, the shift position state signal S2, and the automatic driving state signal S3. Specifically, the determination unit 72 sets the value of the flag F to "1", when it is determined that all of three conditions (a), (b), and (c) described below are satisfied. Further, the determination unit 72 sets the value of the flag F to "0", when it is determined that at least one of the three conditions (a), (b) and (c) is not satisfied.

(a) The operating state of the automatic driving control function is not the on-state.
(b) The shift position is not in the reverse range (R range).
(c) The vehicle speed state is normal.

The switching processing unit 73 takes in the restriction value $\theta_{L1}$ calculated by the restriction value calculation unit 71 and a restriction value $\theta_{L0}$ that is a fixed value stored in a storage device of the turning control unit 36. The restriction value $\theta_{L0}$ is set based on the limit value of the angle that allows the balance between the maximum output of the turning motor 32 and the axial force to be kept depending on the axial force characteristic of the vehicle. The restriction value $\theta_{L0}$ may be set to the same value as the above-described maximum value $\theta_{max}$.

The switching processing unit 73 selects one of the restriction value $\theta_{L1}$ and the restriction value $\theta_{L0}$, as a pre-restriction value $\theta_{L2}$, depending on the value of the flag F set by the determination unit 72. When the value of the flag F is "1", the switching processing unit 73 selects the restriction value $\theta_{L1}$ as the pre-restriction value $\theta_{L2}$. When the value of the flag F is "0", the switching processing unit 73 selects the restriction value $\theta_{L0}$ as the pre-restriction value $\theta_{L2}$.

The gradual change processing unit 74 takes in the pre-restriction value $\theta_{L2}$ selected by the switching processing unit 73. The gradual change processing unit 74 calculates a final restriction value $\theta_{L3}$ by performing a gradual change process for the pre-restriction value $\theta_{L2}$ with respect to time, that is, a process for gradually changing the pre-restriction value $\theta_{L2}$ with respect to time. As the gradual change processing unit 74, a low-pass filter may be employed.

The guard processing unit 75 takes in the target pinion angle $\theta_p^*$ calculated by the target pinion angle calculation unit 62 and the final restriction value $\theta_{L3}$ calculated by the gradual change processing unit 74. The guard processing unit 75 executes a restriction process for the target pinion angle $\theta_p^*$ based on the final restriction value $\theta_{L3}$. That is, the guard processing unit 75 compares the absolute value of the target pinion angle $\theta_p^*$ and the restriction value $\theta_{L3}$. In the case where the absolute value of the target pinion angle $\theta_p^*$ is larger than the restriction value $\theta_{L3}$, the guard processing unit 75 restricts the absolute value of the target pinion angle $\theta_p^*$ to the restriction value $\theta_{L3}$. The target pinion angle $\theta_p^*$ after the restriction process is supplied to the pinion angle feedback control unit 63, as the final target pinion angle $\theta_p^*$. In the case where the absolute value of the target pinion angle $\theta_p^*$ is a value equal to or smaller than the restriction value $\theta_{L3}$, the guard processing unit 75 supplies the target pinion angle $\theta_p^*$ calculated by the target pinion angle calculation unit 62 to the pinion angle feedback control unit 63, as the final target pinion angle $\theta_p^*$.

With the embodiment, it is possible to obtain effects descried below. The target pinion angle $\theta_p^*$ is corrected such that the target pinion angle $\theta_p^*$ is the angle within the angle region in which it is possible to keep the force balance between the maximum output of the turning motor 32 and the axial force depending on the axial force characteristic of the vehicle. Therefore, the target pinion angle $\theta_p^*$ is avoided from being in an angle region in which it is difficult to keep the force balance between the turning force of the turning motor and the axial force, that is, from being an angle at which it is difficult to smoothly turn the turning wheels 12. Therefore, it is possible to avoid the situation of the generation of the axial force exceeding the maximal turning force that can be generated by the turning motor 32. Accordingly, it is possible to smoothly turn the turning wheels 12 depending on the steering state of the steering wheel 11.

There is fear that the driver has a strangeness feeling about a vehicle behavior associated with the execution of the correction process for the target pinion angle $\theta_p^*$. The strangeness feeling can be strong, particularly, in the vehicle stop state or the extremely low speed state, in which a situation of a larger turning easily occurs. In this regard, in the embodiment, in the vehicle stop state or the extremely low speed state, the gradient of the increase in the restriction value $\theta_{L1}$ to the increase in the absolute value of the target pinion angle $\theta_p^*$ becomes gentler as the absolute value of the target pinion angle $\theta_p^*$ increases. Therefore, the absolute value of the target pinion angle $\theta_p^*$ that is restricted by the restriction value $\theta_{L1}$ more slowly increases toward the maximum value $\theta_{MAX}$. Accordingly, it is possible to reduce the strangeness feeling of the driver about the vehicle behavior.

The switching processing unit 73 selects the restriction value $\theta_{L1}$ calculated by the restriction value calculation unit 71, as the pre-restriction value $\theta_{L2}$, in the case of the extremely low speed region, and selects the restriction value $\theta_{L0}$ that is a fixed value, as the pre-restriction value $\theta_{L2}$, in the case of a middle or high speed region. That is, the pre-restriction value $\theta_{L2}$ switches between the restriction value $\theta_{L1}$ and the restriction value $\theta_{L0}$, depending on the vehicle speed. On this occasion, there can be a large difference between the restriction value $\theta_{L1}$ and the restriction value $\theta_{L0}$, depending on the value of the target pinion angle $\theta_p^*$. In this case, there is fear that the value of the final target pinion angle $\theta_p^*$ rapidly changes due to a rapid change in the pre-restriction value $\theta_{L2}$. In this regard, in the embodiment, the gradual change process is performed for the pre-restriction value $\theta_{L2}$ selected by the switching processing unit 73. Therefore, in the case where the pre-restriction value $\theta_{L2}$ switches between the restriction value $\theta_{L1}$ and the restriction value $\theta_{L0}$, the rapid change in the pre-restriction value $\theta_{L2}$ and further the rapid change in the value of the final target pinion angle $\theta_p^*$ are avoided.

Depending on a product specification or the like, it is required not to hinder the execution of the automatic driving control in the case where the automatic driving control function is in the on-state. That is, a control device for the automatic driving control sets an additional angle that is an angle to be added to the target pinion angle or the current target pinion angle, as a command value for causing the vehicle to travel on a target lane, for example. In this case, when the restriction value $\theta_{L1}$ based on the map $M_L$ is selected as the pre-restriction value $\theta_{L2}$, there is fear that the target pinion angle set by the control device for the automatic driving control is restricted by the restriction value $\theta_{L1}$ based on the map $M_L$. In this regard, in the case where the operating state of the automatic driving control function is the on-state, the determination unit 72 determines that the current situation is a situation where the restriction value $\theta_{L1}$ calculated by the restriction value calculation unit 71 should be disabled. Accordingly, in the case where the automatic driving control function is in the on-state, the correction process for the target pinion angle $\theta_p^*$ through the restriction process with the restriction value $\theta_{L1}$ based on the map $M_L$ is not performed even when the vehicle speed V is a speed within the extremely low speed region. Thereby, it is possible to avoid the execution of the automatic driving control from being hindered.

In the case where the vehicle speed state is not normal, when the restriction process with the restriction value $\theta_{L1}$ is executed based on the abnormal vehicle speed V, there is fear that the restriction process rather gives the strangeness feeling to the driver. In this regard, in the case where the vehicle speed state is not normal, the determination unit 72 determines that the current situation is a situation where the restriction value $\theta_{L1}$ calculated by the restriction value calculation unit 71 should be disabled. Accordingly, in the case where the vehicle speed state is not normal, the correction process for the target pinion angle $\theta_p^*$ through the restriction process with the restriction value $\theta_{L1}$ based on the map $M_L$ is not performed even when the vehicle speed V is a speed within the extremely low speed region. Thereby, it is possible to avoid the strangeness feeling from being given to the driver.

In some cases, a so-called back guide monitor function is provided depending on the product specification or the like. The back guide monitor function is a function to assist a backward movement operation of the vehicle, as exemplified by a parking in a garage and a parallel parking, by attaching a camera to a rear portion and displaying an image photographed by the camera and an expected pathway line (expected trajectory line) of the vehicle on a display in a vehicle cabin. In the case where the backward movement operation is performed in the extremely low speed region based on the function, when the restriction process with the restriction value $\theta_{L1}$ is performed at the time of the backward movement operation, the expected pathway line of the vehicle or the like changes depending on the vehicle speed V, and there is fear that the restriction process rather gives the strangeness feeling to the driver. In this regard, in the case where the shift position is in the reverse range, that is, in the case where the backward movement operation of the vehicle is performed, the determination unit 72 determines that the current situation is a situation where the restriction value $\theta_{L1}$ calculated by the restriction value calculation unit 71 should be disabled. Accordingly, in the case where the shift position is in the reverse range, the correction process for the target pinion angle $\theta_p^*$ through the restriction process with the restriction value $\theta_{L1}$ based on the map $M_L$ is not performed even when the vehicle speed V is a speed within the extremely low speed region. Thereby, it is possible to avoid the strangeness feeling from being given to the driver.

Other Embodiments

The embodiment may be carried out while being modified as follows. In the embodiment, the target pinion angle $\theta_p^*$ calculated by the target pinion angle calculation unit 62 is corrected by being restricted by the final restriction value $\theta_{L3}$. However, the target pinion angle $\theta_p^*$ may be corrected as follows. That is, the target pinion angle $\theta_p^*$ calculated by the target pinion angle calculation unit 62 is offset depending on the vehicle speed. For example, in the extremely low speed region, a subtraction value $\theta_{off}$ is subtracted from the target pinion angle $\theta_p^*$ calculated by the target pinion angle calculation unit 62, for obtaining the same characteristic as the change characteristic of the restriction value $\theta_{L1}$ for the target pinion angle $\theta_p^*$ shown by the characteristic line L1 in the graph in FIG. 4 (see Expression (1)). The subtraction value $\theta_{off}$ changes depending on the target pinion angle $\theta_p^*$ calculated by the target pinion angle calculation unit 62.

$$\theta_p^*(\text{final}) = \theta_p^* - \theta_{off} \qquad (1)$$

In the embodiment, the determination unit 72 determines whether the current situation is a situation where the restriction value $\theta_{L1}$ calculated by the restriction value calculation unit 71 should be enabled or a situation where the restriction value $\theta_{L1}$ should be disabled, based on whether the three conditions (a), (b), and (c) described above are satisfied, but the determination is not limited to this. For example, one or two of the three conditions (a), (b), and (c) may be employed, and the determination may be performed based on whether the conditions are satisfied. Even in this case, it is possible to obtain even effect corresponding to the embodiment.

Depending on the product specification or the like, a configuration in which the gradual change processing unit 74 is excluded may be employed as the correction processing unit 66. The reaction force control unit 27 and the turning control unit 36 may constitute a single control device.

In embodiment, a so-called linkless structure in which the dynamic power transmission is separated between the steering shaft 21 and the turning wheels 12 is employed as the steering device 10 of the vehicle. However, a structure in which the dynamic power transmission can be separated between the steering shaft 21 and the turning wheels 12 by a clutch may be employed. When the clutch is disconnected, the dynamic power transmission is separated between the steering wheel 11 and the turning wheels 12. When the clutch is connected, the dynamic power transmission is performed between the steering wheel 11 and the turning wheels 12.

What is claimed is:

1. A steering device comprising:
   a turning shaft configured to turn a turning wheel of a vehicle, with dynamic power transmission being separated between the turning shaft and a steering wheel;

a turning motor configured to generate a turning force, the turning force being a torque that is given to the turning shaft for turning the turning wheel; and a control device configured to control the turning motor such that an angle capable of being converted into a turning angle of the turning wheel follows a target angle that is calculated depending on a steering state of the steering wheel, wherein:

the control device is configured to execute a correction process of correcting the target angle such that the target angle after correction is within an angle region in which a force balance is capable of being kept, the force balance being a balance between a maximal turning force that is capable of being generated by the turning motor and an axial force that is generated in the turning shaft; and the control device is configured to correct the target angle, after the target angle has been calculated from a steering angle of the steering wheel, such that a rate of an increase in the target angle is slower as the target angle approaches a limit value of the angle region, when the vehicle is in either a vehicle stop state or an extremely low speed state.

2. The steering device according to claim 1, wherein as part of correcting the target angle, the control device is configured to:
set a restriction value;
compare the restriction value to the target angle; and
when an absolute value of the target angle is greater than an absolute value of the restriction value, output the restriction value as the target angle.

3. The steering device according to claim 1, wherein, as part of correcting the target angle, the control device is configured to set a subtraction value to be subtracted from the target angle that is calculated depending on the steering state of the steering wheel, such that the rate of the increase in the target angle is slower as the target angle approaches the limit value of the angle region, when the vehicle is in either the vehicle stop state or the extremely low speed state.

4. The steering device according to claim 2, wherein:
to set the restriction value, the control device is configured to:
select either a first restriction value or a second restriction value as a pre-restriction value depending on whether the vehicle is or is not in either of the vehicle stop state or the extremely low speed state, the first restriction value being calculated and the second restriction value being a fixed value that is set based on the limit value of the angle region, and
perform a gradual change process on the selected pre-restriction value to output the restriction value.

5. The steering device according to claim 1, wherein in a case where the vehicle has an automatic driving control function, the control device is configured not to execute the correction process regardless of a value of a vehicle speed, when the automatic driving control function is in an on-state.

6. The steering device according to claim 5, wherein the control device is configured not to execute the correction process regardless of the value of the vehicle speed, when a vehicle speed state is not normal, or when a shift position is in a reverse range in a case where the vehicle has a back guide monitor function by which a backward movement operation of the vehicle is assisted.

7. The steering device according to claim 1, wherein upon determining that at least one of following conditions is satisfied, the control device is configured to not execute the correction process:
(a) an operating state of an automatic driving control function of the vehicle is in ON state,
(b) a shift position of the vehicle is in a reverse range, and
(c) a vehicle speed state is not normal.

8. The steering device according to claim 1, wherein the angle capable of being converted into the turning angle of the turning wheel is a pinion angle.

\* \* \* \* \*